US008363023B2

(12) United States Patent
Joguet et al.

(10) Patent No.: US 8,363,023 B2
(45) Date of Patent: Jan. 29, 2013

(54) ANALYZER ELECTRONIC CIRCUIT WITH ENERGIZATION AXIS/DETECTION AXIS ALTERNATION FOR PASSIVE-MATRIX MULTICONTACT TACTILE SENSOR (75) Inventors: Pascal Joguet, Sadirac (FR); Guillaume Largillier, Bordeaux (FR); Julien Olivier, Bordeaux (FR)

(73) Assignee: Stantum, Bordeaux (FR)

( * ) Notice: Subject to any disclaimer, the term of this patent is extended or adjusted under 35 U.S.C. 154(b) by 223 days.

(21) Appl. No.: 12/809,344

(22) PCT Filed: Dec. 19, 2008

(86) PCT No.: PCT/FR2008/001810
§ 371 (c)(1),
(2), (4) Date: Jun. 18, 2010

(87) PCT Pub. No.: WO2009/112650
PCT Pub. Date: Sep. 17, 2009

(65) Prior Publication Data
US 2010/0302197 A1 Dec. 2, 2010

(30) Foreign Application Priority Data
Dec. 19, 2007 (FR) ...................................... 07 60018

(51) Int. Cl.
*G06F 3/041* (2006.01)
(52) U.S. Cl. ...................... 345/173; 345/174; 178/18.05; 178/18.06

(58) Field of Classification Search .................. 345/173, 345/174; 178/18.01, 18.05, 18.06
See application file for complete search history.

(56) References Cited

U.S. PATENT DOCUMENTS

| 6,075,520 A | 6/2000 | Inoue et al. |
| 2002/0093491 A1* | 7/2002 | Gillespie et al. .............. 345/173 |
| 2003/0098858 A1 | 5/2003 | Perski et al. |
| 2004/0090431 A1* | 5/2004 | Kong et al. ................... 345/173 |
| 2007/0138513 A1 | 6/2007 | Sato et al. |

OTHER PUBLICATIONS

U.S. Appl. No. 12/809,434, filed Jun. 18, 2010, Joguet, et al.
U.S. Appl. No. 12/809,349, filed Jun. 18, 2010, Joguet, et al.

* cited by examiner

*Primary Examiner* — Stephen Sherman
(74) *Attorney, Agent, or Firm* — Oblon, Spivak, McClelland, Maier & Neustadt, L.L.P.

(57) ABSTRACT

An electronic analysis circuit of a multicontact passive-matrix tactile sensor including an electrical supply mechanism powering one of two axes of the matrix, and a mechanism detecting electrical characteristics along the other axis of the matrix, at intersections between the two axes. The supply axis and the detection axis are alternated. A multicontact passive-matrix tactile sensor includes an electrical supply mechanism powering one of the two axes of the matrix, a mechanism detecting electrical characteristics along the other axis of the matrix, at the intersections between the two axes, and such an electronic circuit.

12 Claims, 7 Drawing Sheets

ANALYZER ELECTRONIC CIRCUIT WITH ENERGIZATION AXIS/DETECTION AXIS ALTERNATION FOR PASSIVE-MATRIX MULTICONTACT TACTILE SENSOR

The present invention concerns an analyzer electronic circuit with energization axis/detection axis alternation for passive-matrix multicontact tactile sensors.

The present invention concerns the field of transparent passive-matrix multicontact tactile sensors.

This type of sensor is provided with means for simultaneous acquisition of the position, the pressure, the size, the shape and the movement of a number of fingers on its surface, in order to control a device, preferably via a graphical interface.

Said sensors may be used as interfaces for personal computers, portable or otherwise, cellular telephones, automatic teller machines (banks, points of sale, ticket sales), games consoles, portable multimedia players (digital walkman), control of audiovisual equipment or domestic electrical appliances, control of industrial equipment, GPS navigation devices (the above list is not limiting on the invention).

There are known in the prior art transparent multicontact tactile sensors. Such a sensor consists of a tactile interaction surface featuring two non-parallel arrays. Each array consists of a set of generally parallel tracks. These arrays define between them nodes situated at the projection of the intersection of one array on the other. At these nodes are provided physical measurement means delivering information as a function of the presence on the corresponding contact area. These sensors make it possible to know the state of a plurality of contact areas simultaneously. The measurement effected at each node corresponds to a measurement of voltage or of capacitance at the terminals of the two array elements associated with the node concerned. Each array is scanned sequentially and quickly to create an image of the sensor several times per second. In order to ensure a suitable response time, it is imperative to be able to measure the activity of a finger with a maximum latency time of 20 milliseconds.

One solution that has been proposed in the prior art is described in the patent FR 2,866,726 and is aimed at a control device for manipulating virtual graphic objects on a multicontact tactile display. Said device further comprises an analysis electronic circuit making it possible to acquire and analyze data from the sensor using a sampling frequency of 100 Hz. The sensor can be divided into a plurality of areas in order to effect parallel processing of said areas.

It includes a matrix of conductive tracks, said matrix including energization means on one of the two axes and electrical characteristic detection means on the other axis, at the intersections between the two axes.

The drawback of this solution is that the data measured and processed by said analysis electronic circuit is liable to be subject to interference phenomena and problems linked to the resistivity of the materials, above all in the case of deposited ITO (indium-tin oxide) transparent conductive materials. Said data measured and processed then impacts significantly on the accuracy and the sensitivity of the tactile sensor employed.

The object of the present invention is to remedy this drawback by proposing an analysis electronic circuit configured in such a manner as to detect and avoid possible artifacts.

To this end, the present invention proposes an analyzer electronic circuit of a passive-matrix multicontact tactile sensor including means for energization of one of the two axes of the matrix and means for detecting electrical characteristics on the other axis of the matrix at the intersections between the two axes, characterized in that the energization axis and the detection axis are alternated.

In a first embodiment of the present invention, the electrical characteristic measured is resistance.

In a second embodiment of the present invention, the electrical characteristic measured is capacitance.

In one particular embodiment of the present invention, the energization axis/detection axis alternation is periodic.

In another particular embodiment of the present invention, the energization axis/detection axis alternation is conditioned by the detection of an artifact.

In a further particular embodiment of the present invention, the energization axis/detection axis alternation is conditioned by the reception of a control signal.

In another particular embodiment of the invention, the analyzer electronic circuit controls the sensor during a scanning phase by energizing the successive tracks of one of the networks and detecting the response on each of the tracks of the second network.

In another particular embodiment of the present invention the alternation of the energization axis and the detection axis corresponds to an alternation between a scanning phase with the columns as the energization axis and the rows as the detection axis and a scanning phase with the rows as the energization axis and the columns as the detection axis.

The invention also concerns a passive-matrix multicontact tactile sensor including means for energization of one of the two axes of the matrix and means for detecting electrical characteristics on the other axis of the matrix at the intersections between the two axes, said tactile sensor also including an electronic circuit.

The invention will be better understood after reading the detailed description of one non-limiting embodiment of the invention accompanied by figures respectively representing.

An analyzer electronic circuit of the invention is intended to be integrated into a passive-matrix multicontact tactile sensor.

Figure 1:
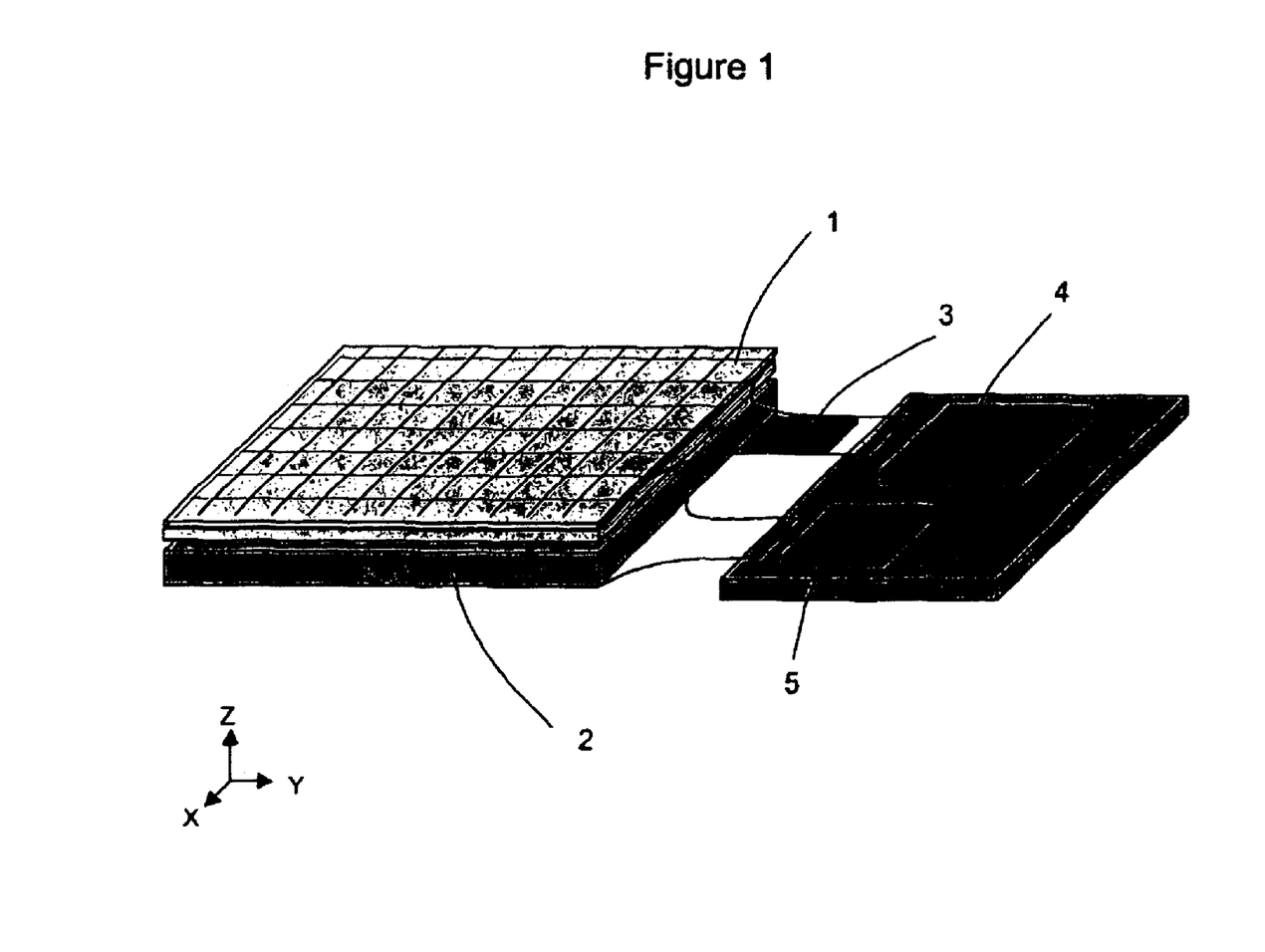
FIG. 1, a view of a passive-matrix multicontact tactile display.

FIG. 1 represents a view of a tactile electronic device comprising:

a matrix tactile sensor 1,
a display screen 2, a capture interface 3,
a main processor 4, and
a graphic processor 5.

the first fundamental element of said tactile device is the tactile sensor 1, necessary for multicontact acquisition and manipulation with the aid of a capture interface 3. This capture interface 3 includes acquisition and analysis electronic circuits.

Said tactile sensor 1 is of matrix type. Said sensor may be divided into a plurality of portions in order to accelerate capture, each portion being scanned simultaneously.

Data from the capture interface 3 is transmitted after filtering to the main processor 4. The latter executes the local program making it possible to associate data from the pad with graphic objects that are displayed on the screen 2 in order to be manipulated.

The main processor 4 also sends the graphical user interface the data to be displayed on the display screen 2. This graphical user interface can be driven by a graphics processor 5.

The tactile sensor is controlled in the following manner: during a first scanning phase, the tracks of one of the networks are energized successively and the response on each of the tracks of the second network is detected. Contact areas are determined as a function of these responses that correspond to the nodes the state whereof is modified relative to the idle state. One or more sets of adjacent nodes the state whereof is modified are determined. A set of such adjacent nodes defines a contact area. Position information referred to in the present patent as a cursor is calculated from this set of nodes. In the case of a plurality of sets of nodes separated by non-active areas, a plurality of independent cursors is determined during the same scanning phase.

This information is refreshed periodically during new scanning phases.

The cursors are created, tracked or destroyed as a function of information obtained during successive scans. For example, the cursor is calculated by a contact area barycenter function.

The general principle is to create as many cursors as there are areas detected on the tactile sensor and to follow their evolution in time. When the user removes his fingers from the sensor, the associated cursors are destroyed. In this way it is possible to capture simultaneously the position and the movement of a plurality of fingers on the tactile sensor.

To find out if a row has been brought into contact with a column, determining a point of contact on the sensor 1, the electrical characteristics—voltage, capacitance or inductance—at the terminals of each node of the matrix are measured.

The main processor 4 executes a program making it possible to associate data from the sensor with graphic objects that are displayed on the display screen 2 in order to be manipulated.

Figure 2:
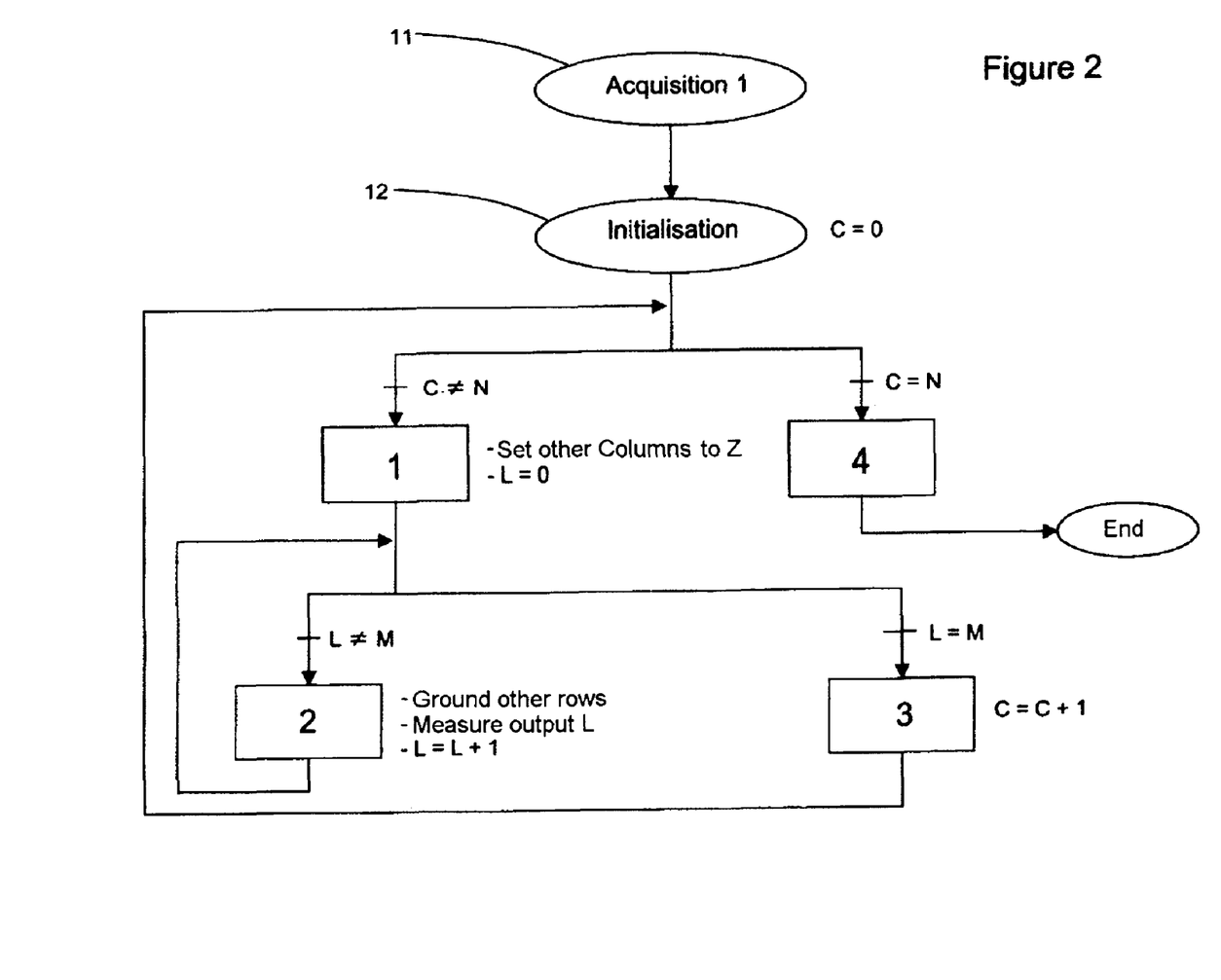
FIG. 2, a diagram of a method of acquisition of data over the whole of the tactile sensor used by the electronic circuit with the columns as energization axis and the rows as detection axis, FIG. 3, a diagram of the method of acquisition of data over the whole of the tactile sensor used by the electronic circuit with the rows as energization axis and the columns as detection axis, FIG. 4, a diagram of a data analysis method used by the electronic circuit, FIG. 5, a diagram of an acquisition and analysis method used by an electronic circuit of a first embodiment of the present invention, said method including periodic energization axis/detection axis alternation, FIG. 6, a diagram of an acquisition and analysis method used by an electronic circuit of a second embodiment of the present invention, said method including energization axis/detection axis alternation conditioned by the detection, if any, of an artifact, and FIG. 7, a diagram of an acquisition and analysis method used by an electronic circuit of a third embodiment of the present invention, said method including energization axis/detection axis conditioned by a control signal.

FIG. 2 represents a diagram of the "acquisition 1" method 11 of acquisition of data over the whole of the tactile sensor used by the electronic circuit, with the columns as energization axis and the rows as detection axis. Said sensor comprises M rows and N columns.

The function of this method is to determine the state of each node of the matrix sensor 1, namely whether said node is activated or not.

Said method corresponds to measuring all the nodes of a "voltage" matrix. Said matrix is an [N,M] matrix containing at each point (I,J) the value of the voltage measured at the terminals of the point of intersection of the row I and the column J, with $1 \leq I \leq N$ and $1 \leq J \leq M$. This matrix makes it possible to give the state of each point of the matrix sensor 1 at a given time.

The method 11 of acquisition begins with a step 12 of initializing data obtained during a preceding acquisition.

The column axis constitutes the energization axis and the row axis constitutes the detection axis.

The method 11 first scans the first column. It is energized at 5 volts, for example. The electronic circuit measures an electrical characteristic at the point of intersection between said column and each of rows 1 to N.

When the measurement has been effected for the Nth row, the method proceeds to the next column and starts to measure electrical characteristics at the intersection of the new column and each of rows 1 to N.

When all the columns have been scanned, the electrical characteristics of each of the points of the matrix sensor have been measured. This terminates the method and the electronic circuit 10 can proceed to analyze the "voltage" matrix obtained.

Figure 3:
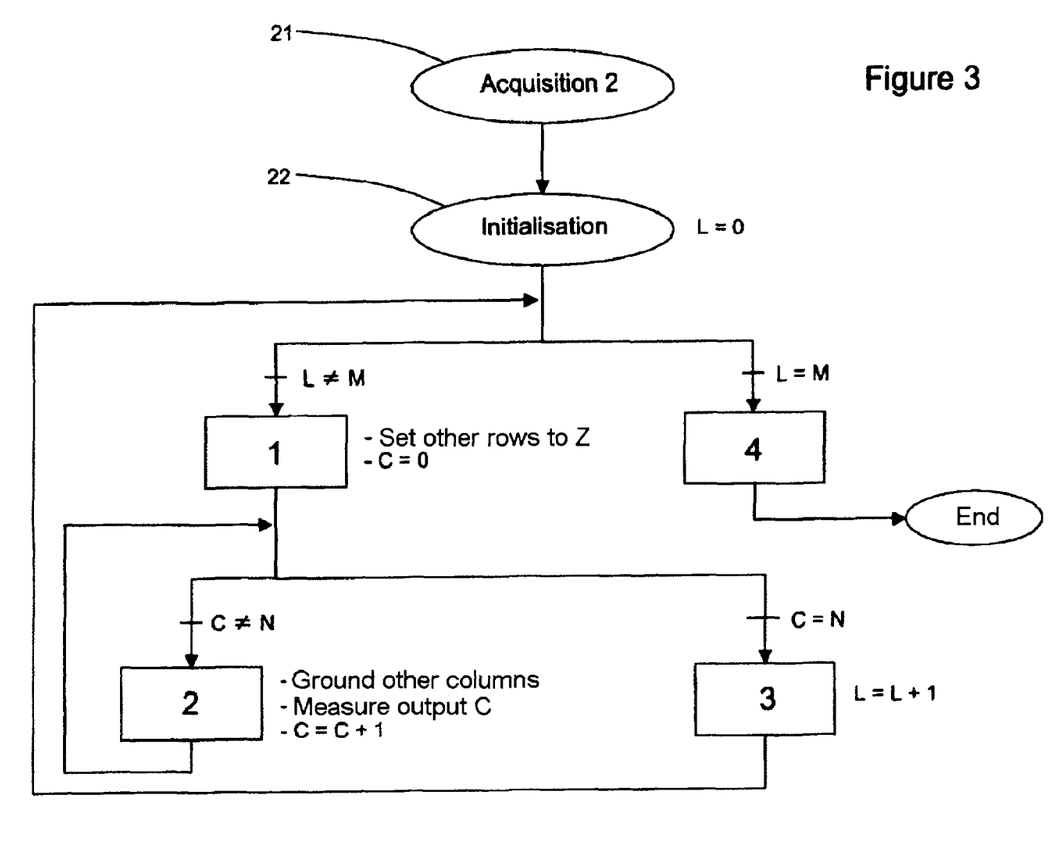

FIG. 3 represents a diagram of the "acquisition 2" method 21 of acquisition of data over the whole of the sensor used by the electronic circuit, with the rows as energization axis and the columns as detection axis.

Said method 21 is analogous to the data acquisition method 11 (acquisition 1). In fact only the energization and detection axes have been interchanged.

The method of acquisition begins with a step 12 of initializing data obtained during a preceding acquisition.

Then, the method first scans the first row. It is energized at 5 volts, for example. The electronic circuit measures the voltage at the terminals of the node between said row and each of columns 1 to M.

When the measurement has been effected for the Mth column, the method proceeds to the next row and starts to measure the voltage at the terminals of the intersection of the new row and each of columns 1 to M.

When all the rows have been scanned, the electrical characteristics of each of the points of the matrix sensor 1 have been measured. This terminates the method and the electronic circuit 10 can proceed to analyze the "voltage" matrix obtained.

Figure 4:
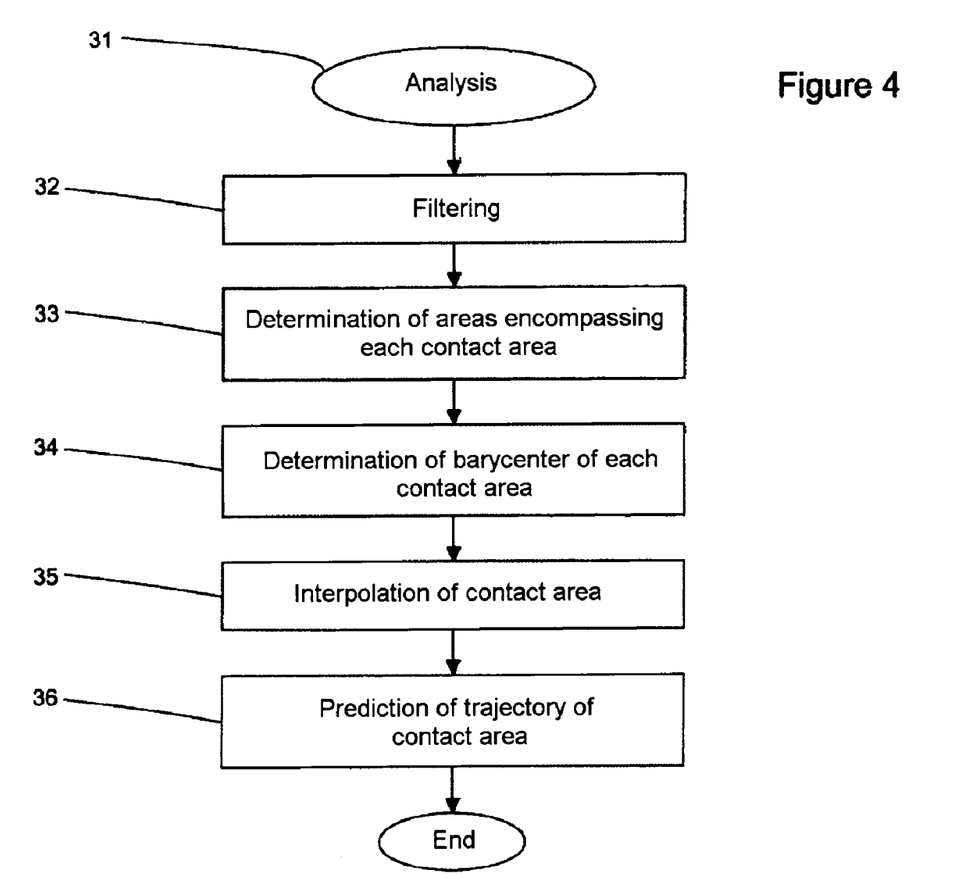

FIG. 4 represents a diagram of the "analysis" method 31 of analyzing data used by the electronic circuit.

Said method 31 consists of a series of algorithms performing the following steps:
  one or more filter steps 32,
  determination 33 of the areas encompassing each contact area,
  determination 34 of the barycenter of each contact area,
  interpolation 35 of the contact area, and
  prediction 36 of the trajectory of the contact area.

Once the method 31 of analysis has finished, the software is able to apply specific processing operations to the virtual graphic objects on the tactile electronic device in order to refresh said tactile electronic device in real time. Areas encompassing the contact areas detected during the data acquisition step 11 or 21 are also defined.

Figure 5:
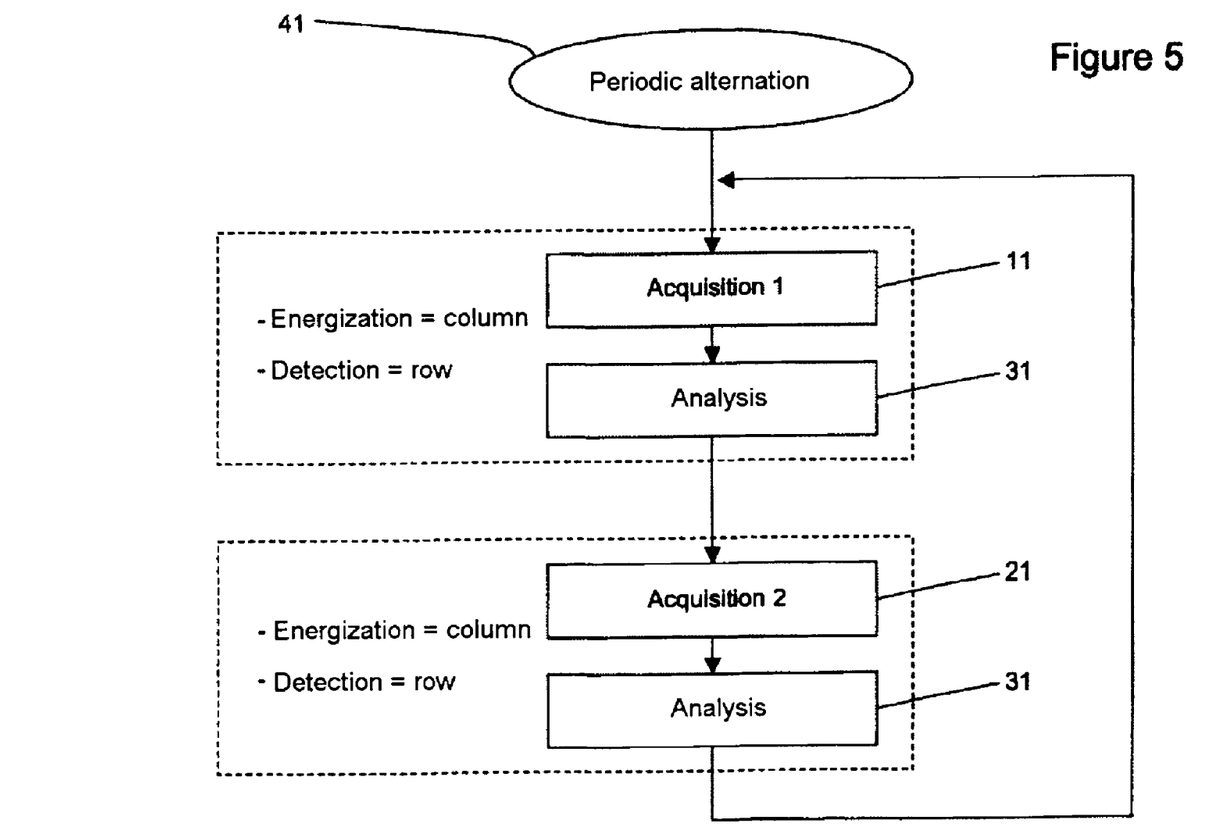

FIG. 5 represents a diagram of an acquisition and analysis method 41 used by an electronic circuit of a first embodiment of the present invention. Said method 41 is an energization axis/detection axis alternation method, said alternation being periodic.

In this embodiment, the electronic circuit performs the acquisition step 11 and the analysis step 31 successively. The succession of the steps 11 and 31 corresponds to acquisition-analysis with the columns as energization axis and the rows as detection axis.

After the steps 11 and 31, a new succession of acquisition steps 21 and analysis steps 31 is effected to perform acquisition-analysis with the rows as energization axis and the columns as detection axis.

The method 41 executes a loop comprising the succession of steps 11, 31, 21 and 31. This makes it possible to alternate the energization and detection axes.

In another variant of this embodiment, the method performs the first succession of steps 11 and 31 K times, then the second succession of steps 21 and 31 L times, K and L being integers at least one of which is strictly greater than 1.

The refresh frequency is of the order of 100 Hertz, for example.

Figure 6:
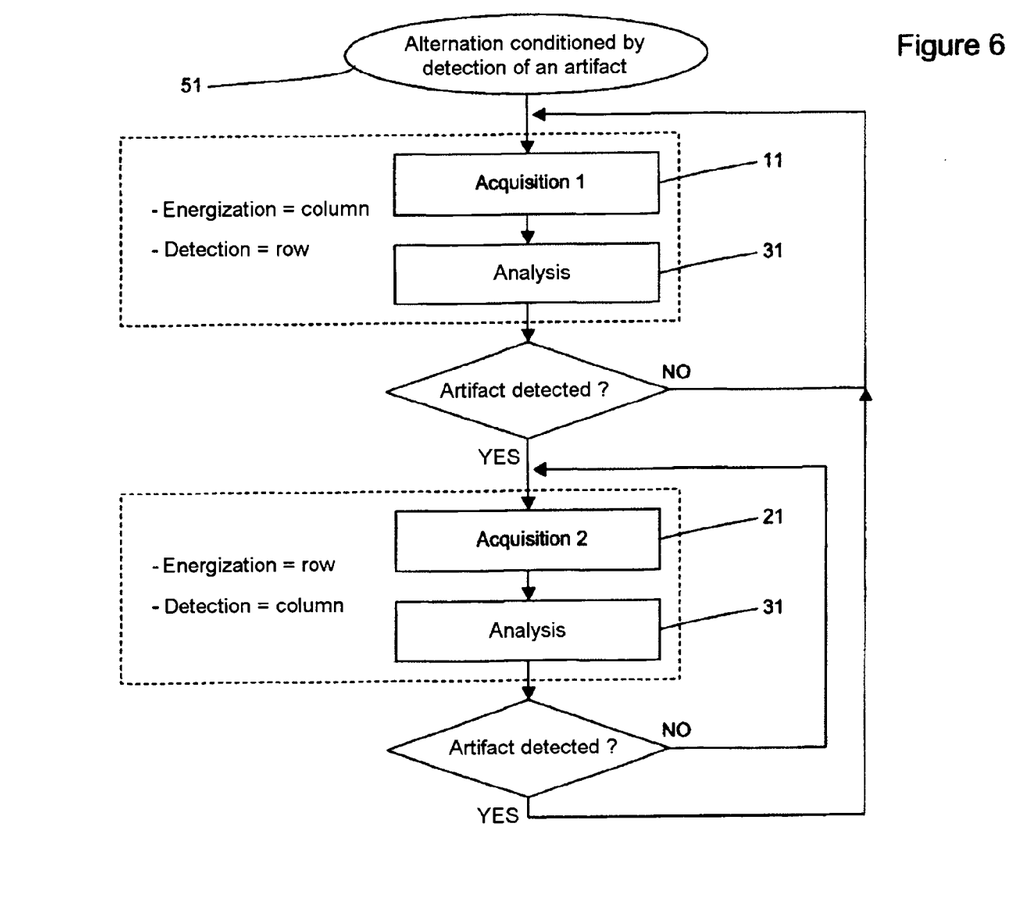

FIG. 6 represents a diagram of an acquisition and analysis method 51 used by an electronic circuit of a second embodiment of the present invention. Said method is an energization axis/detection axis alternation method, said alternation being conditioned by the detection, if any, of an artifact.

In this embodiment of the present invention, the method 51 performs the successions of steps (11, 31) and (21, 31).

The passage from one to the other of the steps (11, 31) and (21, 31) is conditioned by the detection, if any, of an artifact resulting from each of the analysis steps 31 performed.

Each time a step 31 performed during the succession of steps (11, 31) or (21, 31) ends, the electronic circuit determines if an artifact type interference phenomenon is present over at least part of the matrix sensor 1 for which the state data of each of the nodes has been acquired and analyzed. If no artifact is detected on exit from a succession of steps (11, 31) or (21, 31), then the method loops on the same steps. If an artifact has been detected, then the method alternates the succession of steps. For example, if an artifact is not detected on exit from the steps (11, 31), the method loops on said steps (11, 31), but if an artifact is actually detected, the method alternates on the steps (21, 31).

Figure 7:
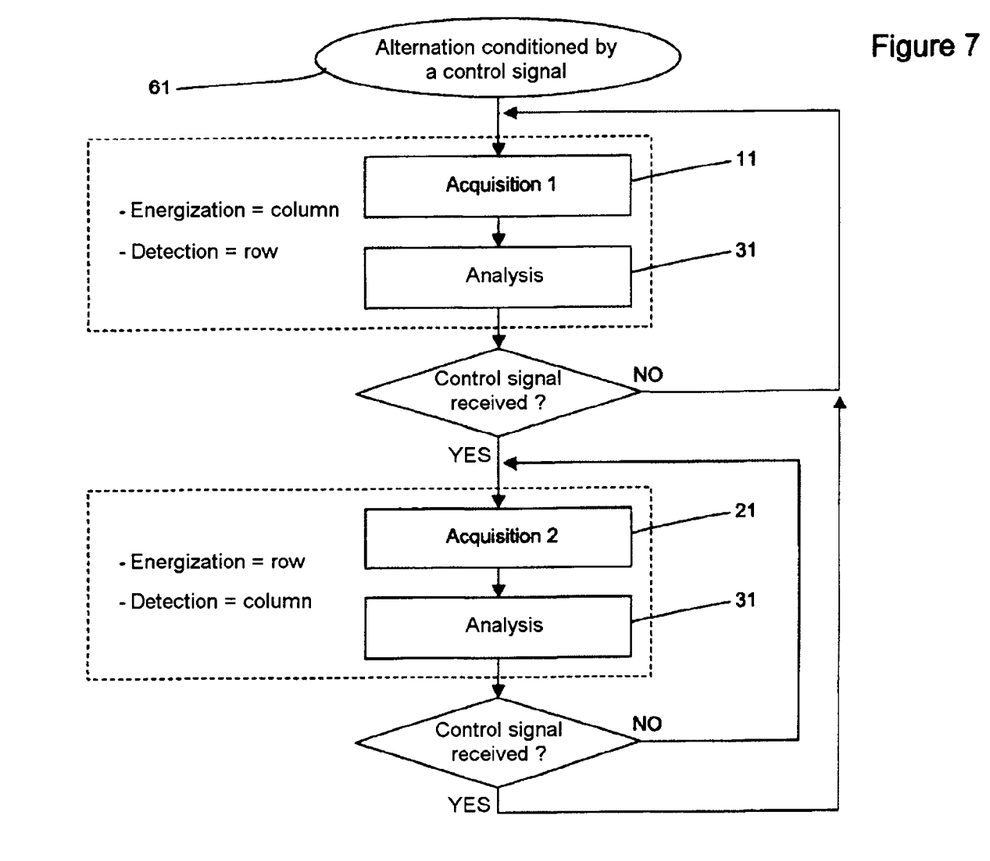

FIG. 7 represents a diagram of an acquisition and analysis method 61 used by an electronic circuit of a third embodiment of the present invention. Said method 61 is an energization axis/detection axis alternation method, said alternation being conditioned by a control signal.

In this embodiment of the present invention, the method performs the succession of steps (11, 31) and (21, 31).

The passage from one to the other of the steps (11, 31) and (21, 31) is conditioned by a control signal.

Each time a step 31 performed during the succession of steps (11, 31) or (21, 31) ends, the electronic circuit determines if it has received a control signal between said succession of steps and the preceding one. If no control signal has been received, then the method loops on the same steps. If a control signal has been received, then the method alternates the succession of steps. For example, if a control signal has been received on exit from the steps (11, 31), the method loops on said steps (11, 31), but if a control signal has actually been received, the method alternates on the steps (21, 31).

A tactile electronic device provided with a multicontact tactile sensor integrating an analysis electronic circuit of any of the embodiments of the present invention described above has the advantage of providing a solution adequate to the occurrence of interference phenomena and problems linked to the resistivity of the materials.

The embodiments of the present invention described above are described by way of example and are in no way limiting on the invention. It must be understood that persons skilled in the art are in a position to produce variants of the invention without departing from the scope of the invention.

The invention claimed is:

1. An analyzer electronic circuit of a passive-matrix multicontact tactile sensor comprising:
   means for energization of one of two axes of the passive-matrix multicontact tactile sensor;
   means for detecting electrical characteristics on the other axis of the passive-matrix multicontact tactile sensor at intersections between the two axes; and
   means for analyzing data corresponding to the detected electrical characteristics by
      filtering the data,
      determining one or more contact areas on the passive-matrix multicontact tactile sensor based on the data,
      determining a barycenter for each of the one or more contact areas, and
      interpolating the contact areas,
   wherein the energization axis and the detection axis are alternated.

2. An analyzer electronic circuit as claimed in claim 1, wherein the electrical characteristic measured is resistance.

3. An analyzer electronic circuit as claimed in claim 1, wherein the electrical characteristic measured is capacitance.

4. An analyzer electronic circuit as claimed claim 1, wherein the energization axis/detection axis alternation is periodic.

5. An analyzer electronic circuit as claimed in claim 1, wherein the energization axis/detection axis alternation is conditioned by detection of an artifact.

6. An analyzer electronic circuit as claimed in claim 1, wherein the energization axis/detection axis alternation is conditioned by reception of a control signal.

7. An analyzer electronic circuit as claimed in claim 1, wherein the analyzer electronic circuit controls the sensor during a scanning phase by energizing successive tracks of one of networks and detecting a response on each of the tracks of a second network.

8. An analyzer electronic circuit as claimed in claim 1, wherein the alternation of the energization axis and the detection axis corresponds to an alternation between a scanning phase with columns as the energization axis and rows as the detection axis and a scanning phase with the rows as the energization axis and the columns as the detection axis.

9. The analyzer electronic circuit according to claim 1, wherein the means for analyzing analyzes the data corresponding to the detected electrical characteristics after the means for detecting electrical characteristics detects the electrical characteristics and before the means for energization energies another of the two axes.

10. The analyzer electronic circuit according to claim 1, wherein the means for detecting further predicts a trajectory of the contact areas.

11. A tactile electronic device comprising:
   a passive-matrix multicontact tactile sensor;
   a display screen;
   a capture interface;
   a main processor;
   a graphics processor; and
   an electronic circuit as claimed in claim 1.

12. An analyzer electronic circuit of a passive-matrix multicontact tactile sensor comprising:
   a main processor including:
      an energization unit to energize of one of two axes of the passive-matrix multicontact tactile sensor;

a detector to detect electrical characteristics on the other axis of the passive-matrix multicontact tactile sensor at intersections between the two axes; and an analyzer to analyze data corresponding to the detected electrical characteristics by
- filtering the data,
- determining one or more contact areas on the passive-matrix multicontact tactile sensor based on the data,
- determining a barycenter for each of the one or more contact areas, and
- interpolating the contact areas, wherein the energization axis and the detection axis are alternated.

* * * * *

UNITED STATES PATENT AND TRADEMARK OFFICE
CERTIFICATE OF CORRECTION

| | |
|---|---|
| PATENT NO. | : 8,363,023 B2 |
| APPLICATION NO. | : 12/809344 |
| DATED | : January 29, 2013 |
| INVENTOR(S) | : Joguet et al. |

It is certified that error appears in the above-identified patent and that said Letters Patent is hereby corrected as shown below:

Delete fig. 5 and substitute therefor the drawing sheet, consisting of fig. 5 as shown on the attached page.

Signed and Sealed this
Fourteenth Day of May, 2013

Teresa Stanek Rea
*Acting Director of the United States Patent and Trademark Office*